Nov. 27, 1923.  G. H. AHLBRECHT  1,475,271
WATER POWER
Filed Nov. 27, 1922  3 Sheets-Sheet 2
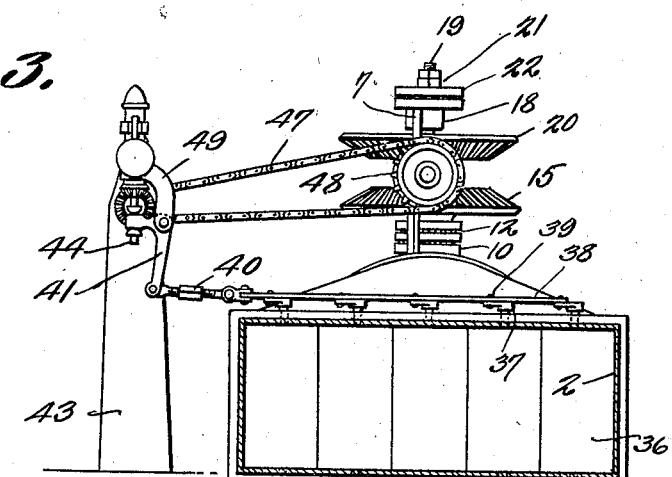
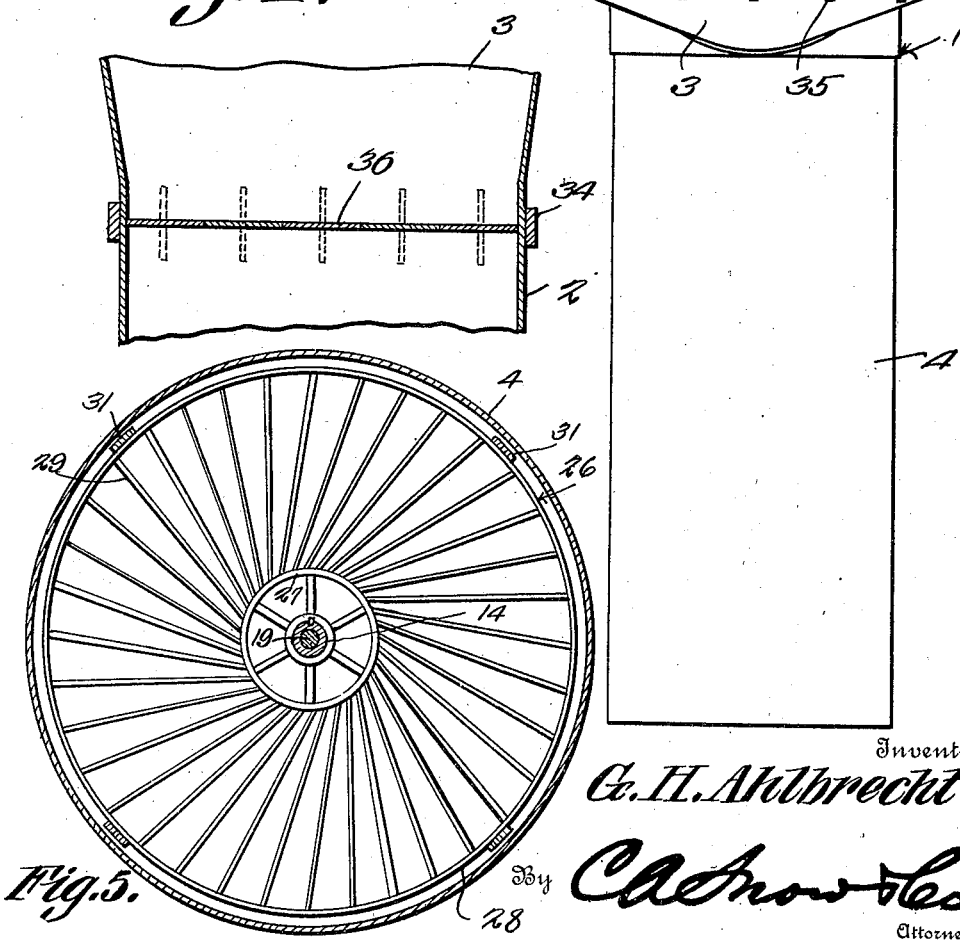

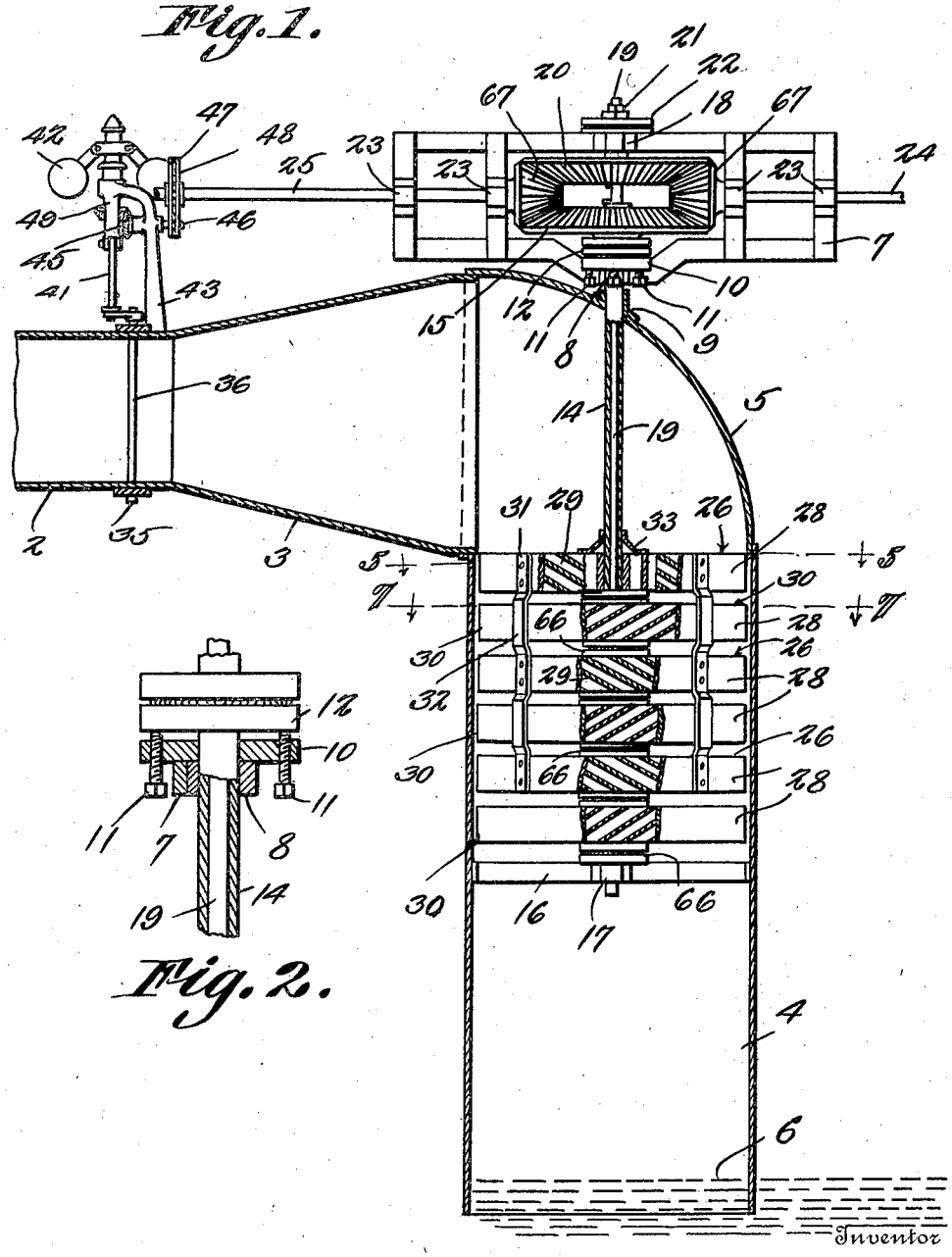

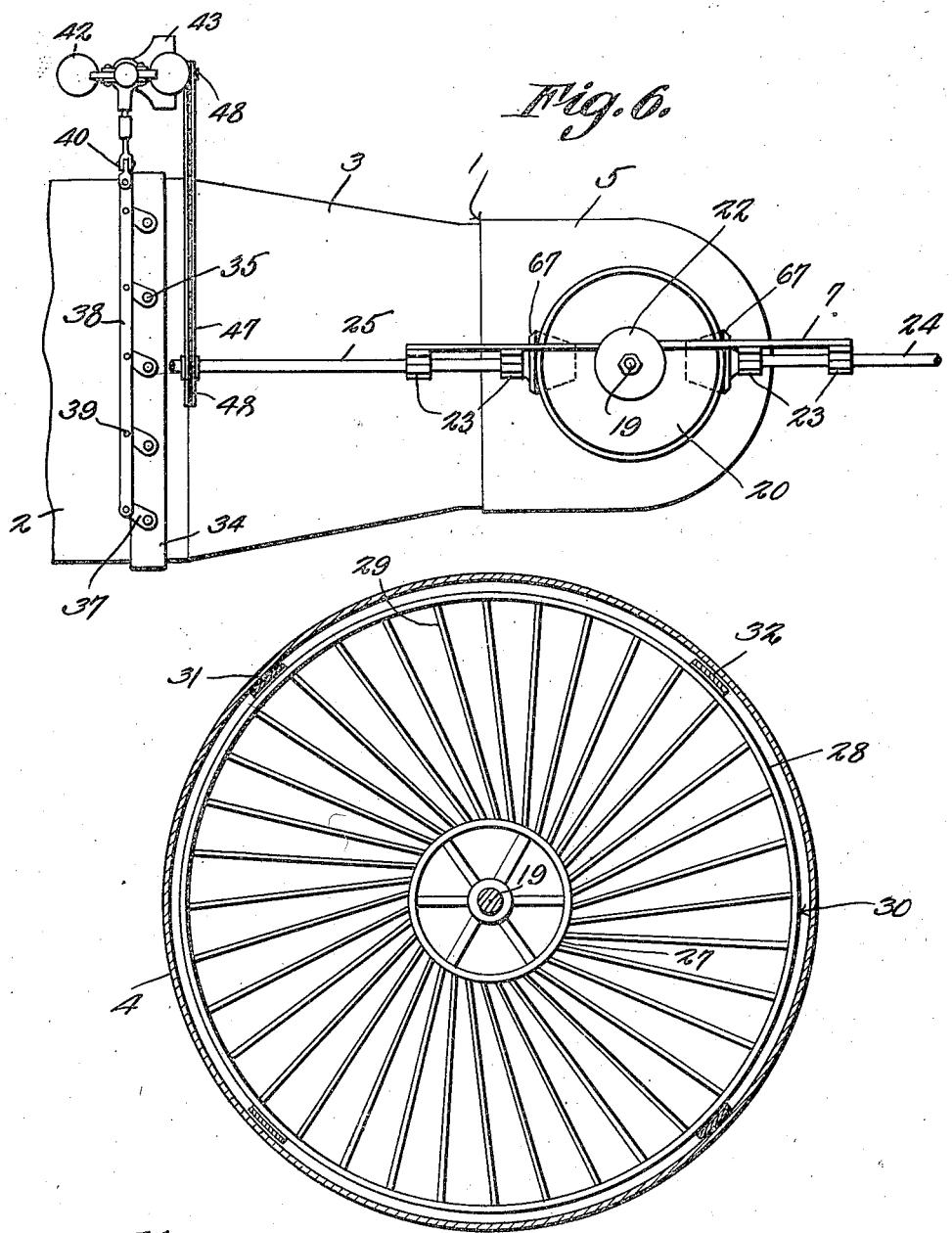

Patented Nov. 27, 1923.

1,475,271

UNITED STATES PATENT OFFICE.

GUSTAVE H. AHLBRECHT, OF NEWARK, OHIO.

WATER POWER.

Application filed November 27, 1922. Serial No. 603,607.

*To all whom it may concern:*

Be it known that I, GUSTAVE H. AHLBRECHT, a citizen of the United States, residing at Newark, in the county of Licking and State of Ohio, have invented a new and useful Water Power, of which the following is a specification.

It is one object of this invention to provide a novel mechanism whereby a maximum amount of power may be derived from a vertically moving body of water, the device including such an arrangement of water wheels with respect to each other, in two sets, that after the water has passed a wheel in one set, it may be effective to drive an adjoining wheel of the other set, novel means being provided whereby the power may be delivered at the place of use.

Another object of the invention is to provide novel means whereby the water wheels are supported for rotation from an accessible overhead point, as distinguished from being carried by a thrust bearing, disposed at an inaccessible point in the tail race or elsewhere, novel means being provided whereby the wear, due to the overhead suspension of the water wheels, may be taken up, thereby enabling sundry elements of the driving train to mesh properly with each other.

A further object of the invention is to provide novel means whereby the amount of water delivered to the wheels may be regulated automatically, responsive to the speed of rotation of certain driven parts, and to the load which is imposed on the machine.

It is within the province of the disclosure to improve generally, and to enhance the utility of, devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—Figure 1 is a vertical section, wherein appears a device constructed in accordance with the invention, parts appearing in elevation, and parts being broken away; Figure 2 is a sectional detail illustrating the means whereby one of the shafts may be raised, to secure a proper meshing of the driving gears; Figure 3 is an elevation in which the device is viewed at right angles to the showing of Figure 1; Figure 4 is a fragmental horizontal section illustrating the valves or gates which regulate the amount of water delivered; Figure 5 is a cross section wherein one of the water wheels appears in plan; Figure 6 is a top plan of the complete device as disclosed in Figures 1 and 3; Figure 7 is a cross section, wherein another of the water wheels appears in plan.

In carrying out the invention, there is provided a conduit, denoted generally by the numeral 1, the conduit embodying a valve casing 2, from which the horizontal portion 3 of the conduit extends, the horizontal portion of the conduit being connected to the vertical depending part 4 thereof by an elbow 5. The lower end of the part 4 of the conduit 1 is sealed as indicated at 6, by the water in the tail race. Rigidly held above the elbow 5 is a frame or support 7, the lower bar of which carries a bearing 8, there being a bearing 9 on the elbow 5. A foot plate 10 is mounted on the lower bar of the frame 7, and on the bearing 8, as shown in Figure 2. The foot plate 10 carries adjusting devices 11, such as screws, an anti-friction bearing 12 being supported on the adjusting devices. A hollow shaft 14 is journaled in the bearing 9, in the bearing 8 and in the foot plate 10, a horizontally disposed beveled gear 15 being secured to the upper end of the shaft 14, within the frame 7, the hub of the beveled gear resting on the anti-friction bearing 12.

A cross bar 16 or other suitable support is fixed in the vertical part 4 of the conduit 1 and is provided with a bearing 17. There is a bearing 18 on the upper bar of the frame 7, and in the bearings 17 and 18, a shaft 19, hereinafter alluded to as a second shaft, is journaled, the shaft 19 passing through the hollow shaft 14. A horizontal beveled gear 20 is secured to the shaft 19, adjacent to the upper end thereof, and is located within the frame 7. Adjusting members, such as superposed nuts 21, are carried by the upper end of the shaft 19. An anti-friction bearing 22 surrounds the upper end of the shaft 19 and is interposed between the adjusting nuts 21 and the upper bar of the frame 7, the bearing 18 aiding in supporting the member 22. Bearings 23 are carried by the frame 7, and in the bearings, horizontal shafts 24 and 25 are journaled, the shafts being disposed in axial alinement, if desired. Beveled pinions 67 are secured to the inner ends of the shafts 24 and 25 and mesh with the beveled gear 20 on the shaft 19 and with the beveled gear 15 on the shaft 14, the relative sizes of the parts 15 and 20 on the one hand, and the pinions 67 on the other hand, being such that the shafts 24 and 25 will rotate at a much higher speed than do the shafts 14 and 19, a condition which is peculiarly desirable when the structure forming the subject matter of this application is used for the generation of electricity, it being understood that the power derived is taken off the shafts 24 and 25 by any suitable means (not shown).

Vertically spaced horizontal water wheels 26 are located in the vertical part 4 of the conduit 1. Each water wheel 26 embodies a hub or spider 27, a rim 28, and blades 29 connecting the hub and the rim, the blades being inclined, as shown in Figure 1. The hub 27 of the uppermost wheel 26 is connected to the lower end of the hollow shaft 14, the rims 28 of the wheels being united by rigid connections 31, so that all of the wheels may turn as one member. Disposed in alternating order with the wheels 26 are other wheels 30, constructed like the wheels 26, aside from the fact that the blades of the wheels 30 incline in a direction opposite to that in which the blades of the wheels 26 slope. The connections 31 which unite the wheels 26 are offset as at 32, so as to clear the rims of the wheels 30, to the end that the wheels 30 may rotate freely. The wheels 30 are secured to the lower portion of the second shaft 19, below the lower end of the hollow shaft 14. A conical deflector 33 is attached to the tubular shaft 14 and extends above the hub of the uppermost water wheel 26.

The valve casing 2 of the conduit 1 is surrounded by a bearing frame 34, wherein vertical shafts 35 are journaled, the shafts carrying valves 36 located in the casing. Each shaft 35 is provided at its upper end with a crank arm 37 whereunto an operating member 38, such as a rod, is pivoted at 39. A longitudinally extensible link 40 forms a connection between one end of the operating member 38 and a bell crank lever 41 which is fulcrumed on an arm 49 forming part of a governor mechanism 42 carried by a support 43. The shaft 44 of the governor mechanism is connected by beveled pinions 45 with a shaft 46 journaled in the support 43 and connected to the shaft 25 by a chain 47 and sprocket wheels 48.

As a general statement, the water proceeding through the conduit 1 traverses the inclined blades 29 of the uppermost wheel 26 and moves thence downwardly over the corresponding blades of the next adjacent wheel 30, and, since the blades of the wheels 26 and 30 are oppositely inclined, the falling water will continue to do its work until it has passed below the lowermost wheel 30. The result is that a peculiarly efficient propelling means is provided, the construction being such that the water does not lose its value as a propelling means, when it has passed downwardly below a single wheel.

It is to be observed that the entire weight of the shafts 14 and 19, and of the water wheels carried thereby, is supported by the frame 7. This is advantageous, because there are no bearings needing adjustment, and located in an inaccessible position, in the part 4 of the conduit. After a period of use, it may be necessary to adjust the shafts 14 and 19 vertically, for the purpose of taking up lost motion which may occur between the beveled gears 20 and 15 and the pinions 67. This result may be brought about by lowering the shaft 19 through the instrumentality of the nuts 21, and by raising the shaft 14 through the medium of the adjusting screws 11 which support the anti-friction bearing 12, the latter cooperating with the beveled gear 15 on the shaft 14. Although the weight of the shafts 14 and 19, and the water wheels, is carried by the frame 7, it may be desirable to place anti-friction bearings 66 about the lower end of the shaft 19, between the water wheels, so that, should any of the wheels loosen and move downwardly, the weight of the loosened wheel will be carried into the bearing 66, thereby reducing friction. The deflector 33 prevents the water from moving downwardly through the hubs 27 of the water wheels, and constrains all of the water to pass downwardly over the blades 29 of the wheels. The shafts 14 and 19 are rotated in opposite directions by the water wheels, and from the shafts, motion is transmitted to the shafts 24 and 25, through the instrumentality of the beveled gears 15 and 20 and the beveled pinions 67.

Should the speed of rotation of the shaft 25 or of the shaft 24 vary, due to changing conditions of load, or otherwise, motion will be transmitted to the valves 36 through a train of elements comprising the chain 47 and the sprocket wheels 48, the shaft 46, the beveled pinions 45, the governor shaft 44, the bell crank lever 41, the link 40, the operating member 38, the arms 37 and the shafts 35, the valves 36 being opened and closed, and the supply of water being regulated, responsive to changes in the work which the machine is called upon to perform. The governor mechanism is not described in detail, because any kind of a governor mechanism, adapted for the purpose, may be used.

Owing to the fact that the lower end of the part 4 of the conduit 1 is sealed by water in the tail race, as shown at 6, there is a downward suction on the water wheels 30 and 26, which aids in rotating them, supplemental to the direct action of the downwardly moving water on the blades 29 of the wheels.

What is claimd is:—

1. In a device of the class described, a substantially vertical conduit; a frame located thereabove; a hollow shaft journaled in the frame; a second shaft rotatable in the hollow shaft; a driven shaft journaled in the frame and located substantially at right angles to the hollow shaft and the second shaft; vertically spaced beveled gears on the hollow shaft and the second shaft; a beveled pinion on the driven shaft and meshing with the beveled gears; means for supporting the hollow shaft for rotation and for endwise adjustment on the frame, and means for supporting the second shaft for rotation and for endwise adjustment on the frame, said means being adjustable longitudinally of the respective shafts, thereby to raise the beveled gear of the hollow shaft for accurate meshing with the beveled pinion, and to lower the beveled gear of the second shaft for accurate meshing with the beveled pinion; and superposed water wheels carried by the hollow shaft and the second shaft, the water wheels being located in the conduit and having blades, the blades of one wheel being inclined in a direction opposite to that in which the blades of the other wheel are inclined.

2. In a device of the class described, a substantially vertical conduit; a frame located thereabove; a vertically adjustable member in the lower portion of the frame; an anti-friction bearing supported on said member; a hollow shaft journaled in the frame; a beveled gear mounted on the hollow shaft and supported by the bearing; a second shaft rotatable in the hollow shaft; a beveled gear mounted on the second shaft; an adjusting means movable longitudinally of the second shaft; an anti-friction bearing interposed between the adjusting means and the upper portion of the frame; a driven shaft journaled in the frame and located substantially at right angles to the hollow shaft and the second shaft; a beveled pinion on the driven shaft and located between the beveled gears, in mesh therewith; and superposed water wheels carried by the hollow shaft and the second shaft, the water wheels being located in the conduit and having blades, the blades of one wheel being inclined in a direction opposite to that in which the blades of the other wheel are inclined.

3. In a device of the class described, a substantially vertical conduit; a frame located thereabove; screws vertically adjustable in the lower portion of the frame; a bearing supported on the screws; a hollow shaft journaled in the frame; a beveled gear mounted on the hollow shaft and supported by the bearing; a second shaft rotatable in the hollow shaft; a beveled gear mounted on the second shaft; a nut threaded on the second shaft; a bearing interposed between the nut and the upper portion of the frame; a driven shaft journaled in the frame and located substantially at right angles to the hollow shaft and the second shaft; a beveled pinion on the driven shaft and located between the beveled gears, in mesh therewith; and superposed water wheels carried by the hollow shaft and the second shaft, the water wheels being located in the conduit and having blades, the blades of one wheel being inclined in a direction opposite to that in which the blades of the other wheel are inclined.

In testimony that I claim the foregoing as my own, I have hereto affixed my signature in the presence of two witnesses.

GUSTAVE H. AHLBRECHT.

Witnesses:
F. L. SEARCH,
MASON B. LAWTON.